US006868418B1

(12) United States Patent
Avner et al.

(10) Patent No.: US 6,868,418 B1
(45) Date of Patent: Mar. 15, 2005

(54) METHODS AND SYSTEMS FOR PERFORMING RELIABLE ASYNCHRONOUS NOTIFICATION OF HIGH-LEVEL DOCUMENT OPERATIONS

(75) Inventors: Jon B. Avner, Bellevue, WA (US); Soner F. Terek, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 09/680,045

(22) Filed: Oct. 4, 2000

(51) Int. Cl.[7] ............................. G06F 7/00; G06F 17/00

(52) U.S. Cl. .................................... 707/100; 707/104.1

(58) Field of Search ............................. 707/100, 104.1, 707/104

(56) References Cited

U.S. PATENT DOCUMENTS

| | | | | |
|---|---|---|---|---|
| 5,504,897 A | * | 4/1996 | Gans et al. | 707/104.1 |
| 6,018,762 A | * | 1/2000 | Brunson et al. | 709/206 |
| 6,057,841 A | * | 5/2000 | Thurlow et al. | 345/809 |

OTHER PUBLICATIONS

__, "COM+ Technical Series: Loosely Coupled Events", Sep. 1999, MSDN (TM) <http://msdn.microsoft.com/library/default.asp?url=/library/en-us/dncomser/html/compluscouple.asp>, pp. 1–6.*

* cited by examiner

Primary Examiner—Safet Metjahic
Assistant Examiner—Patrick J. D. Santos
(74) Attorney, Agent, or Firm—Workman Nydegger

(57) ABSTRACT

A mechanism is described for the reliable notification to client applications of the implementation of predefined high-level document commands in a database. The database management system is issued a number of high-level document commands such as "move electronic mail message" or "add folder" which are to be implemented in the underlying database. As each high-level document command is implemented, an entry representing the high-level document command is set in a notification table stored in a persistent memory such as the database. This entry may be set in the same atomic transaction as the other table updates needed to implement the high-level document command. The appropriate notification is then dispatched to any subscribing client applications. The client application then acknowledges to the database application that the notification has been received. In response, the entry is deleted in the notification table in the database. If the database management system were to fail, the system would check the notification table to see what notification it should send upon restarting.

19 Claims, 6 Drawing Sheets

METHODS AND SYSTEMS FOR PERFORMING RELIABLE ASYNCHRONOUS NOTIFICATION OF HIGH-LEVEL DOCUMENT OPERATIONS

BACKGROUND OF THE INVENTION

1. The Field of the Invention

The present invention relates to the field of database management systems. In particular, the present invention relates to methods and systems for performing reliable asynchronous notification of high-level document operations in a database.

2. The Prior State of the Art

With the development of computer networks and the Internet, anyone who has access to an Internet capable computer may access information from all over the world. The present era has even been termed the "information age" due to the widespread abundance of information. Although this abundance of information is useful, individuals may easily be overwhelmed with information to the point where it is difficult to filter out relevant information from irrelevant information.

Database management systems are systems that manage collections of data (i.e., databases) so as to allow individuals, devices and applications to easily access, manage, and update information. Thus, database management systems provide a significant contribution to the information age by allowing for the efficient use of information.

Conventional database management systems such as the database management system 100 shown in FIG. 1 include an underlying database 110 that contains organized data in the form of a number of tables such as table "A", table "B", table "C" and table "D". Each table contains entries that associate documents with properties of the documents. For example, one table may contain a count of the number of files within given folders, another may list the memory size of given files, yet another may list other properties associated with given files, or folders. For each document, there is typically more than one table that may associated with the document by, for example, describing properties of the document.

A document (e.g., document 1, 2, 3 and 4 in FIG. 1) is an identifiable entity from the viewpoint of applications that use the database management system. For example, a folder or an item such as an electronic mail message within the folder may be considered to be a document since they are identified as entities from the viewpoint of the application that uses the database management system. For example, in the context of electronic messaging, an application may present folders such as "in-boxes" and "out-boxes" to a user with corresponding electronic mail messages in the folders. These folders and electronic mail messages are "documents" from the viewpoint of the application. Similarly, files and directories within a file system may also be documents from the viewpoint of the application that uses the database management system. The tables within the underlying database are not considered to be documents since they are identified internal to the database management system, and not at the higher level of the application that uses the database management system.

The database application 120 generates high-level document commands (e.g., high-level command 121) that relate to operations to be performed on a document. Examples of such document commands might include operations such as, for example, move folder, move message, delete message, copy folder, copy file, and so forth.

Each of these high-level document commands is received by the database engine 130 which implements the high-level document commands by executing a number of object commands that result in objects such as tables being updated. Typically, the database engine would use the disk access module 140 (e.g., a disk driver) of an operating system to produce the physical control signals necessary to read and write the appropriate sectors in the disk, each object comprising one or more possibly discontiguous sectors on the disk.

It is often desirable for one client application to receive notification when a high-level document command meeting certain criteria has been implemented by another client application. For example, if a client application is viewing all electronic messages within a folder, notification when another client applications adds a message to the folder will allow the client application to refresh the display.

FIG. 2 illustrates a flowchart of a conventional method 200 for performing notifications that certain high-level document commands have been implemented in the database. When receiving a given high-level document command, the database management system first implements the corresponding high-level document command in the database (act 201). Once implemented, the database management system determines which applications have subscribed to be notified when the given high-level document command is implemented (act 202). The database management system then dispatches a notification that the high-level document command has been implemented (act 203).

The vast majority of the time, when a high-level document command having certain criteria is issued, the subscribing client applications are properly notified of the high-level document command and thus can respond appropriately. However, sometimes computer systems become inoperative due to system failures, corruption, power loss, or the like. In such cases, there is a possibility that the high-level document command is implemented in the database, but that the subscribing client application never receives notification of the implementation. For example, the client application may become inoperative and thus become unable to receive and interpret a notification that a certain high-level document command has been implemented. Also, the database management system itself may become inoperative so that although the command has been implemented, no notification was ever dispatched.

Thus, conventional system contain no guarantee that the proper notifications of a high-level document command will always be dispatched or received if a high-level document command is implemented. Therefore, what are desired are methods and systems for improving accuracy and reliability in notifying client applications that certain high-level document commands have been implemented in a database.

SUMMARY OF THE INVENTION

The principles of the present invention provide for the reliable asynchronous notification to client applications of the implementation of predefined high-level document commands that are implemented in a database managed by a database management system. These notifications are "asynchronous" since the high-level document commands are actually implemented in the database prior to sending the notification to client applications. Thus, the notified client applications do not affect the implementation of the high-level document commands in the database.

The database management system is issued a number of high-level document commands which are to be implemented in the underlying database. Such high-level document commands include high-level commands that relate to actions to be taken on documents such as folders, files, messages and other entities that are identified at the level of the application that uses the database management system. For example, in electronic messaging applications, one high-level document command may be to add a message to a folder.

Ultimately, the database engine implements the high-level document command by altering one or more tables in the database. However, before implementing the high-level command, an entry is set in a notification table stored in a persistent memory such as the database. Alternatively, the entry in the notification table is set in the same transaction as any other table changes that are made to implement the high-level command. In this transaction, either all actions in the transaction are performed (all relevant tables are altered) or no actions in the transaction are taken (none of the relevant tables are altered). Thus, if the entry in the notification table is set, then the corresponding high-level document command is guaranteed to have been implemented in the database.

Ideally, the client application that requested notification and the database management system will continue to be operational. In this ideal case, the notification that the given high-level document command has been implemented is dispatched to the client application. The client application then acknowledges to the database management system that the notification has been received. In response, the entry is deleted in the notification table in the database. The notification may be resent if the database management system does not receive such acknowledgement within an expected time period.

To make sure that the client management system properly performs all actions responsive to the notification, the entry in the notification table may remain set until the database management system receives acknowledgement from the client application that all necessary actions have been performed by the client application. Thus, if a client application fails while implementing any necessary actions responsive to the notification, the notification will be resent to allow the client application to re-perform any necessary actions once the client application becomes operational again.

Suppose now that a system failure occurs at the database management system after the high-level document command is implemented in the database, but before notification is dispatched. Upon restarting the database management system, the system will check the notification table to see what notifications entries are set. These entries correspond to notifications for which the database management system has not received acknowledgement from the client application. The database management system then sends corresponding notifications to the client application. In this manner, the client application receives notification even if a database management system failure occurs.

Now suppose that the notification is indeed dispatched, but that the client application has failed so as to be unable to receive the notification. The database management system will not receive acknowledgement from the client application. Therefore, the database application will resend the notification until the notification is acknowledged upon restarting the client application. In this manner, the client application receives notification even if a client application failure occurs.

Therefore, the principles of the present invention provide for a reliable way of notifying client application when particular high-level document commands are implemented in a database, the notifications surviving even failure of the database management system or client application.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
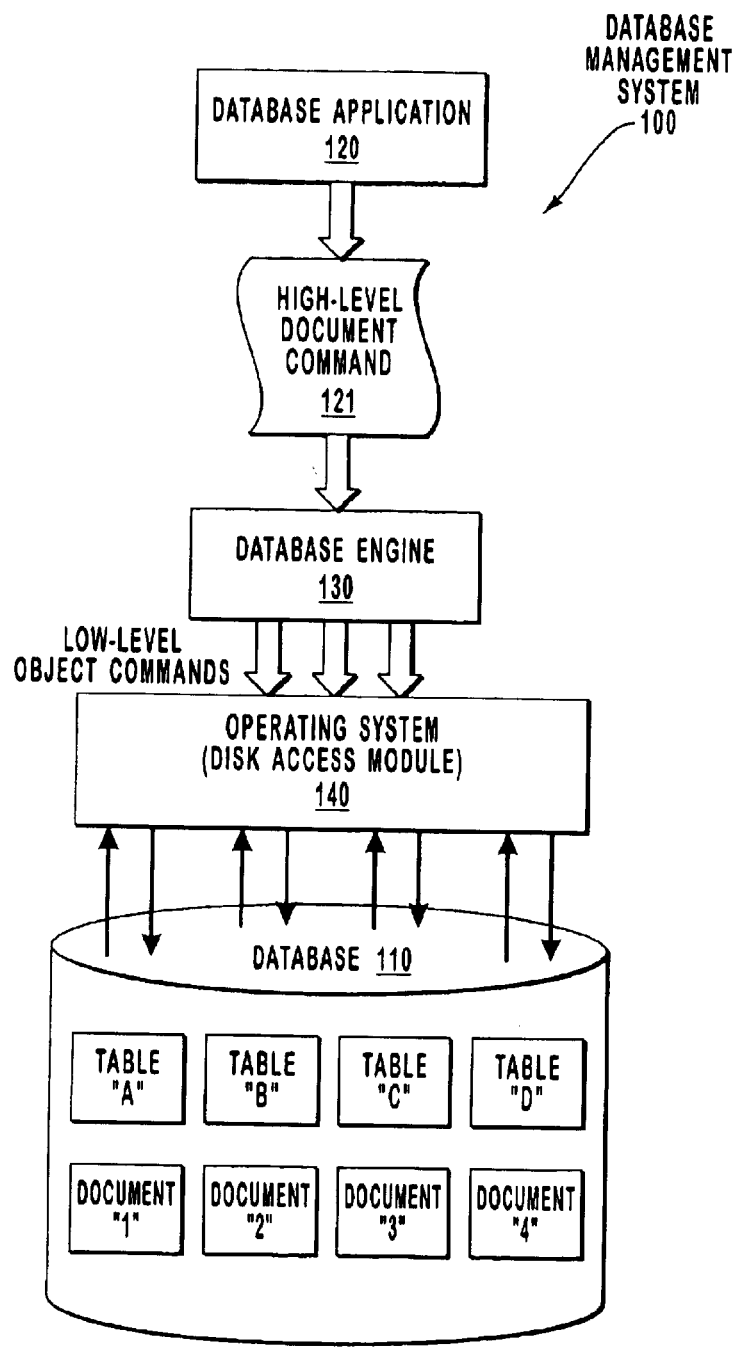
FIG. 1 illustrates a hierarchical view of a database management system in accordance with the prior art.
Figure 2:
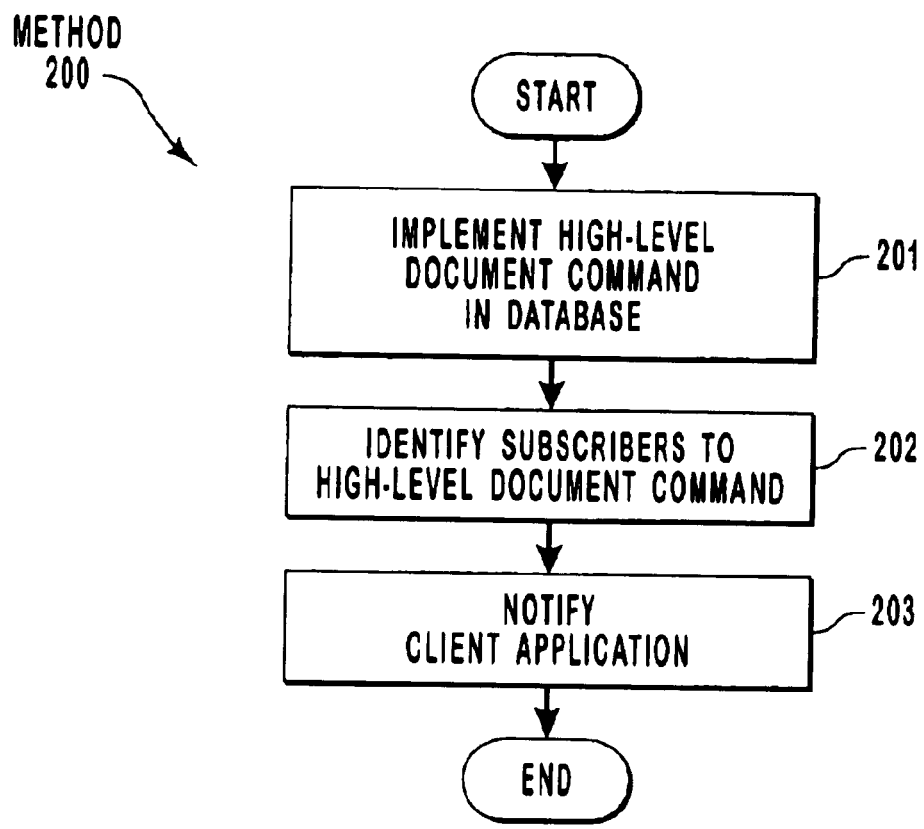
FIG. 2 illustrates a flowchart of a method of notifying client applications when a particular high-level document command is implemented in accordance with the prior art.

The present invention extends to both methods and systems for reliably notifying client applications of the implementation of predefined high-level document commands in a database management system. These notifications are "asynchronous," meaning that the client applications do not affect the implementation of the high-level document command since the implementation takes place prior to the notification.

The notification occurs even if the database management system or the client application experiences a system failure. A notification table records implementation of high-level document commands. Then, notification is dispatched to the client applications that are to be notified. The client application then acknowledges at least receipt of the notification, and perhaps that they have completed performing actions in response to the notification. Upon receiving the acknowledgement, the notification table is updated to remove the record of the high-level document command.

If the database management system or the client application experiences a system failure that inhibits the notification process, the notification is resent after restarting the failed system. Upon restarting the database management system, for example, the database management system checks the notification table and resends any notifications for which there is a record (i.e., notifications which have not been acknowledged). Therefore, the present invention provides for the reliable notification of high-level document commands where the notifications survive even system failures.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer; or special purpose processing device to perform a certain function or group of functions.

Figure 3:
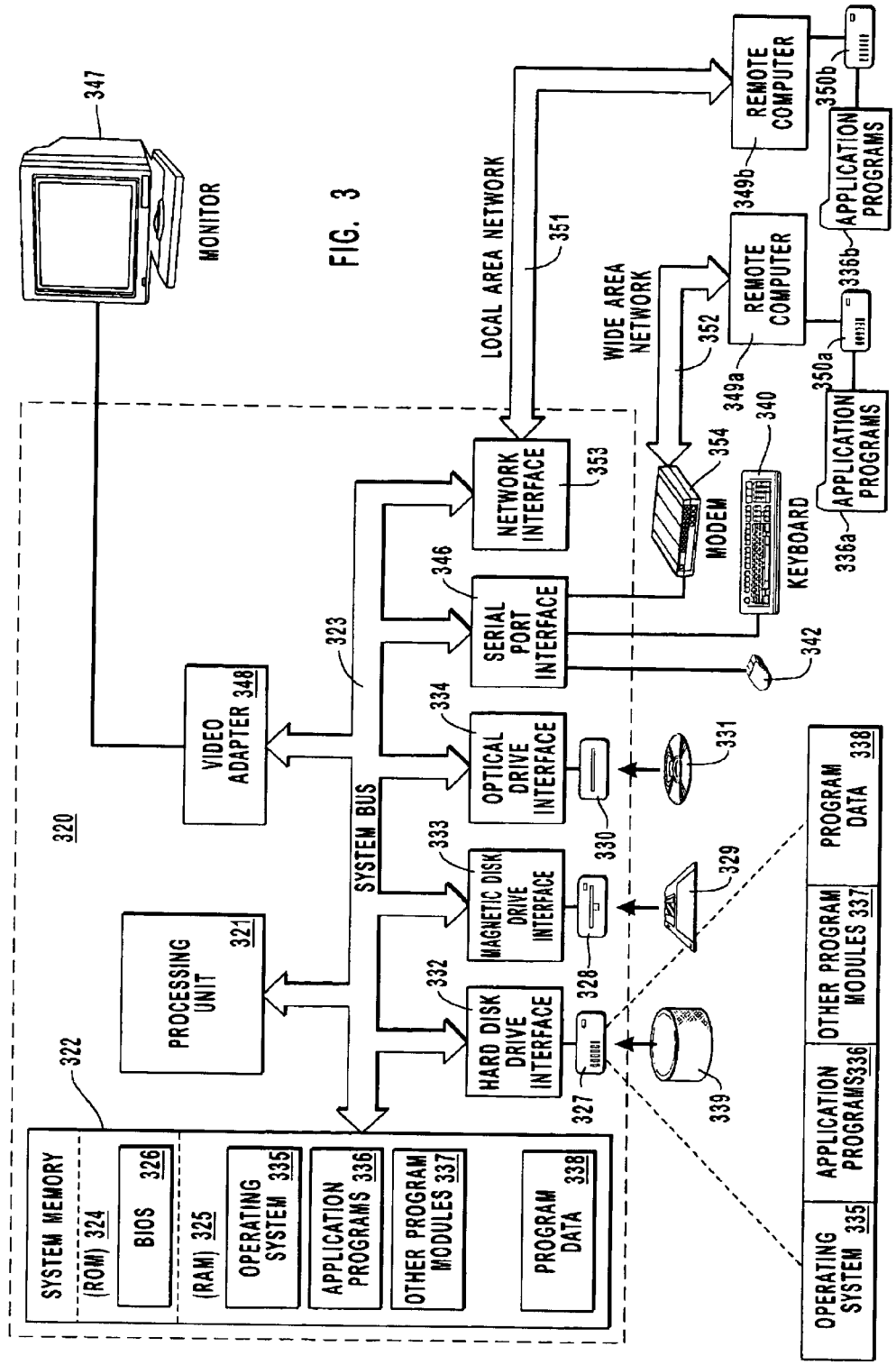
FIG. 3 illustrates an exemplary system that provides a suitable operating environment for the present invention.

FIG. 3 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 3, an exemplary system for implementing the invention includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349*a* and 349*b*. Remote computers 349*a* and 349*b* may each be another personal computer, a server, a router, a network PC, a peer device or other common network node, and typically include many or all of the elements described above relative to the computer 320, although only memory storage devices 350*a* and 350*b* and their associated application programs 336*a* and 336*b* have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

Figure 4:
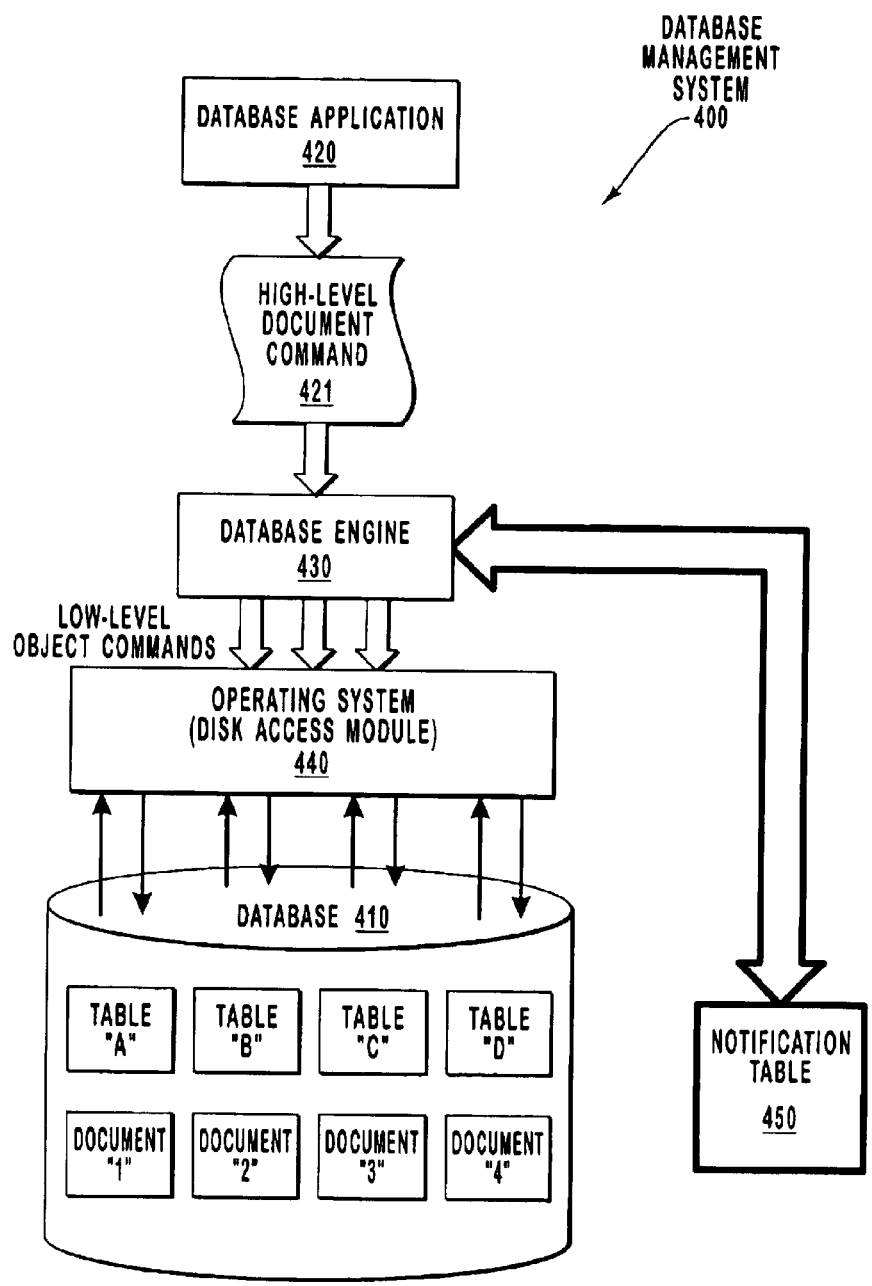
FIG. 4 illustrates a hierarchical view of a database management system in accordance with the present invention in which notifications survive system failures.

FIG. 4 illustrates a database management system 400 in accordance with the present invention. Although, not required, the database management system 400 may be implemented in the computing environment shown in FIG. 4. In contrast to the prior art database management system shown in FIG. 1, the database management system 400 includes a notification table 450. The operation of the database management system 400 of FIG. 4 will be described with respect to the method 500 illustrates in FIG. 5.

Figure 5:
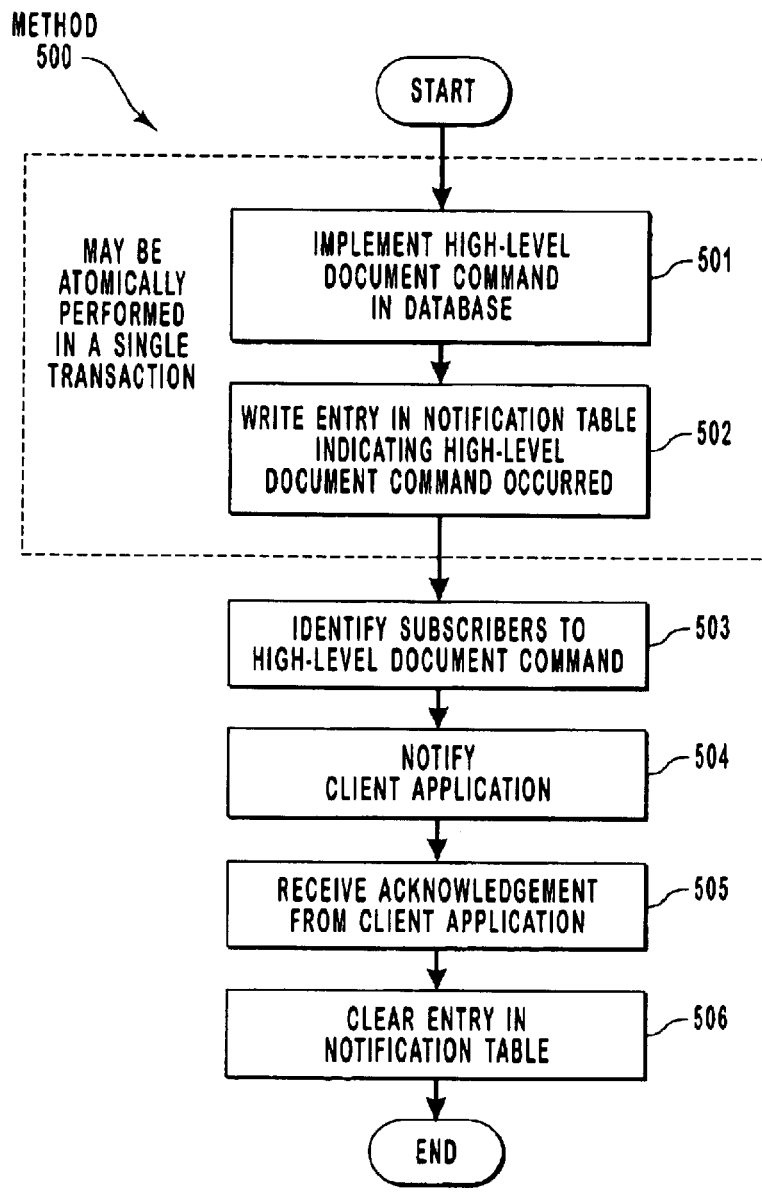
FIG. 5 illustrates a flowchart of a method for guaranteeing notification despite intervening system failures.

FIG. 5 shows a flowchart of a method performed by the database management system 400 to perform reliable notification when a high-level document command is implemented by the database management system. The database application 420 issues a high-level document command 421 to the database engine 430. This high-level document command is for performing a function on a document that the database application recognizes to be a separately identifiable entity. For example, if the database management system supports electronic mail applications, the document may be an electronic mail message or a folder that contains the electronic mail message. Typical operations might be to move, delete, copy, update, or add a new document.

As the database engine 430 receives each high-level document command, the database engine implements the high-level document command in the database 410 (act 501). Typically, implementing a high-level document command in the database may involve changing entries in a number of tables such as tables "A", "B", "C" and "D" since each table could potentially have an entry for the corresponding document. The client application that uses the database management system 400 is typically not concerned with the details of which table needs to be changed. The database engine implements those details usually unbeknownst to the client application that generated the high-level document command. Highly reliable database engines typically perform changes to the tables in a transacted manner so that either all the table changes for the particular high-level document command are made, or none of the table changes are made.

In addition to implementing the high-level document command in the database (act 501), embodiments within the scope of the present invention also include a means or step for ensuring a corresponding notification about the high-level document command is preserved until at least one client application acknowledges the notification. In the embodiment illustrates in FIG. 5, this may be accomplished by performing the remaining acts of the method 500.

For example, in addition to implementing the high-level document command (act 501), the database engine alters the notification table 450 to reflect that the high-level document command has been implemented (act 502). This may be performed before the high-level document command is implemented. However, it is preferred that the notification table be changed atomically with the other tables involved with implementing the high-level document command so that either all the tables are changed together or no changes are made at all. This may be accomplished by having the database engine implement, in a single transaction, the notification table update along with all other table updates needed to implement the high-level document command. If the notification table and the other relevant tables are updated in the same transaction, there is high assurance that the notification table accurately reflects that the high-level document command actually was implemented in the database.

The database management system also identifies any client applications that should be notified of the high-level document command (act 503). Typically, this might involve determining which client application are subscribers to the high-level document command although this is not required. A client application could be notified by default without having subscribed or perhaps a third party client application has directed the other client application to receive notifications of the implementation of certain high-level document commands.

Once the client applications to be notified are identified (act 503), a notification that the high-level document command has been implemented in then dispatched to the identified client applications (act 504). Messaging may be employed to dispatch the notification as when the database management system and the client application to be notified do not reside on the same machine. Alternatively, function calls through an application program interface or through other interfaces may be employed when the database management system and the client application reside on the same machine.

Once notified, the client application may then perform any number and variety of processes in response to receiving the notification. For example, if the original client application has added a new electronic mail message to a public folder, each of the client applications having access to the public folder may be notified. If the client application is already displaying the public folder, the client application would then refresh a display to reflect the addition.

Ultimately, the database management system receives acknowledgement back from the client application that received the notification (act 505). The client application may return this acknowledgement as soon as the client application receives notification. However, it may often be beneficial to return acknowledgement well after this time as soon as the client application has completed performing any processes in response to receiving notifications. This ensures that the client application has successfully completed its purpose in being notified in the first place.

Once the database management system receives acknowledgement back from the client application (act 505), the database management system alters the notification table 450 to delete reference to the implementation of the high-level document command (act 506). Thus, the notification table reflects the implementation of every high-level document command that has been implemented in the database, but for which the database management system has not yet received acknowledgement back from the client application. In this way, the notification table reflects those notifications that should have been sent to the client application, but for which the notification success is uncertain.

As will now be described, this method permits for notifications of the implementation of high-level document commands to survive even system failures. For example, suppose that, for whatever reason, the high-level document command is implemented in the database, but the appropriate notification is never dispatched. Perhaps the database management system experiences a failure after the high-level document command was implemented, but before the database management system actually sent the notification. In this case, at least the database management system would have set the appropriate entries in the notification table to reflect that the high-level document command was implemented.

Figure 6:
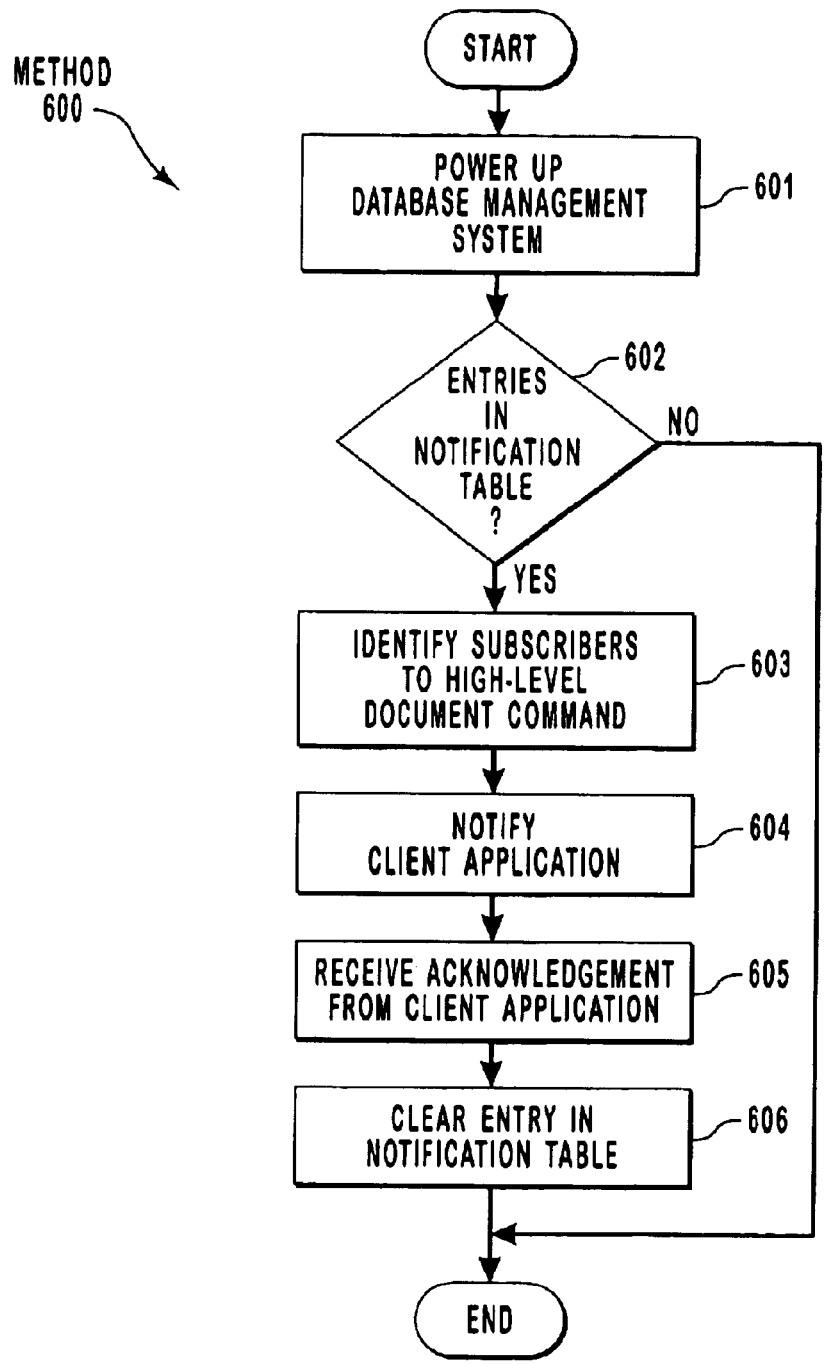
FIG. 6 illustrates a flowchart of a method for recovering from a system failure so as to ensure notification transmission.

FIG. 6 illustrates a flowchart of method 600 of how the database management system would recover from such a failure and send the appropriate notification. Upon restarting the database management system (act 601), the database management system checks the notification table to identify any high-level document commands that were implemented, but for which there has not yet been acknowledgement back from the client application (act 602). If there are none (NO in decision block 602), then no notification needs to be resent and the method ends. If there are some (YES in decision block 602), then the subscribers to the notification are identified (act 603), and the appropriate client applications are notified (act 604). Upon receiving acknowledgement back from the client applications (act 605), the appropriate entry in the notification table is cleared (act 606). Thus, even a failure of the database management system will not prevent appropriate notification.

Furthermore, if, for some reason, the notification was sent, but the client application never received notification, the client application will still be notified. For example, suppose that the machine hosting the client application was to fail, or perhaps the notification medium (e.g., a network) was to fail resulting in the client application not receiving the notification. In this case, the client application would not return an acknowledgement and the entry would remain in the notification table. The database management system may be configured to continue to send the notification on a periodic basis absent an acknowledgement until acknowledgement is finally returned. Thus, notification may even be made if the client application or network should fail.

Thus, the principles of the present invention provide for a reliable way of notifying client applications when a particular high-level document command is implemented in a database. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computing system comprised of an operating system and client applications, and that includes,
   external to the operating system, i) a database application for generating high-level document commands that relate to operations to be performed on a document such as a folder, a file, a message or other such entities that are identified at the level of client applications that use the system, and ii) a database engine for receiving the high-level commands from the database application and then implementing them by executing object commands passed to an operating system, and
   internal to the operating system, a separate notification database containing one or more tables each comprised of objects that define various properties of one or more documents, and wherein the objects contained in the database tables are updated in response to the object commands received from the operating system,
a method for asynchronously notifying client applications of the, implementation of particular high-level document commands so that such notification survives even failures of either the database engine or client applications, and wherein the method is comprised of performing the following acts:
   the database application issuing one or more high-level document commands which are to be implemented;
   either i) before implementing an issued high-level document command, or ii) at the same time that any other table of the database is updated, the database engine altering a persistently stored notification table by creating a notification entry to reflect the implementation of the issued high-level document command, with the result that the client applications do not affect the implementation of the high-level document command since the implementation takes place prior to notification of the client applications, even in the event of failure of either database or the client application, because either,
      for case i), no tables in the database are updated until such failure is restored and notification of implementation is verified by at least one of the client applications to the database engine of the operating system, or
      for case ii), all tables in the database are updated in the same transaction used to create the notification entry when updating the persistently stored notification table of the database engine of the operating system; and
   dispatching from the operating system a notification of the implementation of the issued high-level document command to one or more client applications requiring such notification;
   receiving acknowledgement from at least one of the one or more client applications that the notification has been received; and
   in response to receiving acknowledgement, the database engine altering the notification table to reflect that no client applications any longer treed to be notified of the implementation of the high-level document command.

2. The method in accordance with claim 1, wherein the notification table is stored in the database.

3. The method in accordance with claim 1, wherein the act of dispatching a notification of the implementation to the one or more client applications requiring such notification comprises an act of transmitting a message to a machine that hosts the client application, the machine that host the client application being different than the machine that hosts the database management system.

4. The method in accordance with claim 1, wherein the act of dispatching a notification of the implementation to the one or more client applications requiring such notification comprises an act of passing the notification through a function call to the identified client application, the client application hosted by the same machine as at least the portion of the database management system responsible for performing the act of dispatching the notification.

5. The method in accordance with claim 1, wherein the act of implementing a high-level document command in the database and the act of altering a persistently stored notification table to reflect the implementation occur in the same transaction of a database engine.

6. The method in accordance with claim 1, wherein the act of implementing the high-level document command in the database comprises an act of moving the document.

7. The method in accordance with claim 1, wherein the act of implementing the high-level document command in the database comprises an act of deleting the document.

8. The method in accordance with claim 1, wherein the act of implementing the high-level document command in the database comprises an act of copying the document.

9. The method in accordance with claim 1, wherein the act of implementing the high-level document command in the database comprises an act of adding the document.

10. The method in accordance with claim 1, wherein the act of implementing the high-level document command in the database comprises an act of updating the document.

11. The method in accordance with claim 1, wherein the received acknowledgement indicates that the client application has implemented processes in response to the notification.

12. In a computing system comprised of an operating system and client applications, and that includes, external to the operating system, i) a database application for generating high-level document commands that relate to operations to be performed on a document such as a folder, a file, a message or other such entities that are identified at the level of client applications that use the system, and ii) a database engine for receiving the high-level commands from the database application and then implementing them by executing object commands passed to an operating system, and internal to the operating system, a separate notification database containing one or more tables each comprised of objects that define various properties of one or more documents, and wherein the objects contained in the database tables are updated in response to the object commands received from the operating system, a computer program product comprised of computer-executable instructions for implementing a method for asynchronously notifying client applications of the implementation of particular high-level document commands so that such notification survives even failures of either the database engine or client applications, and wherein the method is comprised of performing the following acts:

the database application issuing one or more high-level document commands which are to be implemented;

either i) before implementing an issued high-level document command, or ii) at the same time that any other table of the database is updated, the database engine altering a persistently stored notification table by creating a notification entry to reflect the implementation of the issued high-level document command, with the result that the client applications do not affect the implementation of the high-level document command since the implementation takes place prior to notification of the client applications, even in the event of failure of either database or the client application, because either, for case i), no tables in the database are updated until such failure is restored and notification of implementation is verified by at least one of the client applications to the database engine of the operating system, or for case ii), all tables in the database are updated in the same transaction used to created the notification entry when updating the persistently stored notification table of the database engine of the operating system; and dispatching from the operating system a notification of the implementation of the issued high-level document command to one or more client applications requiring such notification;

receiving acknowledgement from at least one of the one or more client applications that the notification has been received; and in response to receiving acknowledgement, the database engine altering the notification table to reflect that no client applications any longer need to be notified of the implementation of the high-level document command.

13. The computer program product in accordance with claim 12, wherein the computer-executable instructions for performing the act of causing a notification of the implementation to be dispatched to the one or more identified client applications comprise computer-executable instructions for performing an act of causing a message to be transmitted to a machine that hosts the client application, the machine that hosts the client application being different than the machine that hosts the database management system.

14. The computer program product in accordance with claim 12, wherein the computer-executable instructions for performing the act of causing a notification of the implementation to be dispatched to the one or more identified client applications comprises computer-executable instructions for performing an act of causing the notification to be passed through a function call to the identified client application, the client application hosted by the same machine; as at least the portion of the database management system responsible for performing the act of dispatching the notification.

15. The computer program product in accordance with claim 12, wherein the computer-executable instructions for performing the act of causing the high-level document command to be implemented in the database comprise computer-executable instructions for performing an act of moving the document.

16. The computer program product in accordance with claim 12, wherein the computer-executable instructions for performing the act of causing the high-level document command to be implemented in the database comprise computer-executable instructions for performing an act of deleting the document.

17. The computer program product in accordance with claim 12, wherein the computer-executable instructions for performing the act of causing the high-level document command to be implemented in the database comprise computer-executable instructions for performing an act of copying the document.

18. The computer program product in accordance with claim 12, wherein the computer-executable instructions for performing the act of causing the high-level document command to be implemented in the database comprises comprise computer-executable instructions for performing an act of adding the document.

19. The computer program product in accordance with claim 12, wherein the computer-executable instructions for performing the act of causing the high-level document command to be implemented in the database comprise computer-executable instructions for performing an act of updating the document.

* * * * *

UNITED STATES PATENT AND TRADEMARK OFFICE
CERTIFICATE OF CORRECTION

PATENT NO. : 6,868,418 B1
APPLICATION NO. : 09/680045
DATED : March 15, 2005
INVENTOR(S) : Avner et al.

Page 1 of 1

It is certified that error appears in the above-identified patent and that said Letters Patent is hereby corrected as shown below:

In column 11, line 67, in Claim 12, delete "created" and insert -- create --, therefor.

In column 12, line 33, in Claim 14, after "machine" delete ";".

In column 12, line 67, in Claim 18, after "database" delete "comprises".

Signed and Sealed this

Twenty-ninth Day of September, 2009

David J. Kappos
*Director of the United States Patent and Trademark Office*